United States Patent [19]

Grigsby, Jr. et al.

[11] Patent Number: 4,705,814

[45] Date of Patent: Nov. 10, 1987

[54] REACTION PRODUCT OF POLYOXYALKYLENE POLYAMINE AND AN ALIPHATIC ISOCYANATE

[75] Inventors: Robert A. Grigsby, Jr., Georgetown; Richard J. G. Dominguez; George P. Speranza, both of Austin, all of Tex.

[73] Assignee: Texaco Inc., White Plains, N.Y.

[21] Appl. No.: 927,475

[22] Filed: Nov. 6, 1986

[51] Int. Cl.$^4$ .............................................. C08G 18/14
[52] U.S. Cl. ...................... 521/159; 528/60; 528/61; 528/68; 528/76; 528/77
[58] Field of Search ................. 521/159; 528/60, 61, 528/68, 76, 77

[56] References Cited

U.S. PATENT DOCUMENTS

| | | | |
|---|---|---|---|
| 3,862,973 | 1/1975 | Dietrich et al. | 260/453 |
| 4,254,069 | 3/1981 | Dominguez et al. | 264/51 |
| 4,272,618 | 6/1981 | Dominguez et al. | 521/160 |
| 4,297,444 | 10/1981 | Dominguez et al. | 521/160 |
| 4,340,712 | 7/1982 | Reichmann et al. | 528/45 |
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,595,743 | 6/1986 | Laughner et al. | 528/73 |
| 4,609,683 | 9/1986 | Grigsby et al. | 521/152 |
| 4,609,684 | 9/1986 | Grigsby et al. | 521/163 |
| 4,611,083 | 9/1986 | Buethe et al. | 560/351 |
| 4,642,320 | 2/1987 | Turner et al. | 521/176 |

FOREIGN PATENT DOCUMENTS 81701A 11/1982 European Pat. Off. .

*Primary Examiner*—Maurice J. Welsh
*Attorney, Agent, or Firm*—Jack H. Park; Kenneth R. Priem

[57] ABSTRACT

This invention relates to a reaction product of polyoxyalkylene polyamine and an isocyanate wherein the polyoxyalkylene polyamine is present in less than the stoichiometric amount.

7 Claims, No Drawings

REACTION PRODUCT OF POLYOXYALKYLENE POLYAMINE AND AN ALIPHATIC ISOCYANATE

BACKGROUND OF THE INVENTION

1. Field of the Invention

This invention concerns the field of reaction products of polyoxyalkylene polyamine and an aliphatic isocyanate.

2. Reference to Related Applications

This application is related to application Ser. No. 927,473 and Ser. No. 927,472 filed of even date.

3. Description of Related Publications

U.S. Pat. Nos. 4,396,729; 4,444,910 and 4,433,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, for example, catalysts.

European Patent application No. 81,701A concerns reaction injection molded elastomers. The corresponding U.S. application Ser. No. 443,444, filed 11/22/82, is the subject of interference proceedings with the '729, '910 and '067 patents referred to above (Interference Nos. 101,393; 101,394; and 101,395).

U.S. Pat. No. 4,530,941 discloses reaction injection molded polyurethanes prepared from a composition comprising (a) a relatively high molecular weight polyol, (b) a chain extender, and (c) a polyisocyanate or polyisothiocyanate improved by replacing a portion of the relatively high molecular weight polyol with an aminated or partially aminated polyoxyalkylene material U.S. Pat. Nos. 4,609,683 and 4,609,684 and application Ser. No. 747,527 filed 6/21/85 disclose or are concerned with quasi-prepolymers of aromatic isocyanates and amine-amides made by the reaction of a polyoxyalkylene polyamine and an isatoic anhydride.

U.S. Pat. No. 4,595,743 discloses RIM elastomers made using amine initiated polyols. The examples disclose the use of quasi-prepolymers.

Our U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. No. 4,297,444 discloses RIM elastomers made using a quasi-prepolymer of an aromatic polyisocyanate containing at least 30% of the high molecular weight polyether polyol.

Numerous publications disclose reactions of certain amines and isocyanates for use in elastomers and elsewhere. For example, see U.S. Pat. No. 4,340,712 and U.S. Pat. No. 3,862,973.

U.S. Pat. No. 4,530,941 discloses RIM elastomers using both polyols and amine-terminated polyols. Quasi-prepolymers like those in U.S. Pat. No. 4,297,444 are recommended.

It is not believed that heretofore it was known to react polyoxyalkylene polyamines in less than stoichiometric amounts with polyisocyanates to form useful products.

SUMMARY OF THE INVENTION

The invention is a reaction product of a polyoxyalkylene polyamine and an aliphatic isocyanate wherein the polyoxyalkylene polyamine is present in less than the stoichiometric amount. The invention is also elastomers made using this reaction product.

DESCRIPTION OF THE PREFERRED EMBODIMENTS

Polyoxyalkylene polyamines, including primary and secondary amine terminated polyether polyols of greater than 1500 average molecular weight having from 2 to 6 functionality, preferably from 2 to 3, and an amine equivalent weight from about 750 to about 4,000 are useful in this invention. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alklene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 per cent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques; for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional material and/or different molecular weight or different chemical composition materials may be used.

In general, aliphatic polyisocynates known in the art are utilizable. Potentially useful aliphatic diisocyanates may include, for example, alkylene diisocyanates with 4 to 12 carbon atoms in the alkylene radical such as 1,12-dodecane diisocyanate, 1,4-tetramethylene diisocyanate and 1,6-hexamethylene diisocyanate, cycloaliphatic diisocyanates such as 1,3-and 1,4-cyclohexane diisocyanate as well as any desired mixture of these isomers, 1-isocyanato-3,3,5-trimethyl-5-isocyanatomethylcyclohexane (isophorone diisocyanate), 4,4'-, 2,2'-and 2,4'-dicyclohexylmethane diisocyanate as well as the corresponding isomer mixtures, and the like.

Included as aliphatic isocyanates useful in this invention are those containing aromatic characteristics but where the isocyanate moities are attached to alipnatic portions of the molecule. Examples have the following type structures:

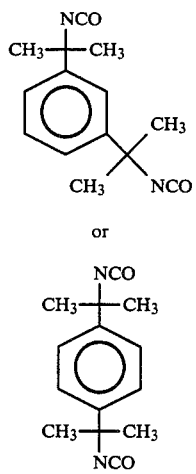

This invention is a method for making reaction products of aliphatic isocyanates and polyoxyalklene polyamines which may be made rapidly without the use of a catalyst. The invention is also the reaction product of the aliphatic isocyanate and polyoxyalkylene polyamine. Catalysts and/or a long reaction time and/or heat are generally required in manufacturing reaction products of polyols and isocyanates.

Polyoxyalkylene polyamines are very reactive with isocyanates and unlike the reaction between polyols and isocyanates, no heat or catalyst is required to carry out the reaction between polyoxyalkylene polyamines and isocyanates. Since the reaction between polyoxyalkylene polyamines and isocyanate takes place quickly and without the addition of a catalyst, it is necessary to provide methods of mixing which will encourage the uniform mixing at a rate as fast as or faster than the reaction is taking place to promote uniform mixing and uniform reactions throughout the mixture. If a vessel is used to provide mixing with a moving or static mechanical stirrer, then the stirring must be at such a rate to provide this uniform and speedy mixing so that the reaction will be homogeneous throughout the mixture. The stirring may also be done by other means known to those skilled in the art such as impingement mixing. In impingement mixing two or more streams are impacted at a high velocity and the resulting turbulence provides intimate mixing very rapidly. Impingement mixing is known to those skilled in the art and, as is known to those in the reaction injection molding area, the head of a RIM machine relies on impingement mixing to mix reactants together. In one embodiment of this invention, a reaction product of a polyoxyalkylene polyamine and an isocyanate could be made by mixing them through the head of a RIM machine or similar device and instead of injecting this material into a mold which is done in the normal RIM process, the mixture would be directed to a container for later use. Depending on the type of polyoxyalkylene polyamine and the type of isocyanate, the degree of speed of mixing necessary to provide the uniform homogeneous reaction would vary. For example, in the case of a typical aliphatic isocyanate reacted with a polyoxyalkylene polyamine, the reaction rate, although fast, might be slow enough to allow mechanical mixing means such as stirrers to be used if desired. However, where the reaction takes place at a very rapid rate, normal mixing means such as stirrers may not be practical since they cannot mix the two components rapidly enough to avoid non-homogeneous reaction phases in the final product. In this case, then the impingement mixing technique or a mixing technique known to those skilled in the art, which is at least as rapid and thorough as impingement mixing, might need tc be used in order that the final product be mixed rapidly and in such a homogeneous manner that the final reacted product is uniform throughout.

When an amount of active hydrogen containing material, whether it be polyol or polyoxyalkylene polyamine, is used which is less than the stoichiometric amount needed to react with the isocyanate present, the product is generally called a quasi-prepoymer. When the reaction product consists of stoichiometrically equal amounts of active hydrogen material and isocyanate, the product is generally called a prepolymer. These materials are useful for the manufacture of plastics called polyurethanes if the final plastic contains only hydroxyl-isocyanate linkages, polyurea/polyurethane if they contain both hydroxyl-isocyanate linkages and amine-isocyanate linkages or polyure products if they contain only amine-isocyanate linkages.

When used to manufacture the above-mentioned polyurethane and/or polyurea plastics, it is necessary to further react the quasi-prepolymers with additional active hydrogen containing material, including but not limited to polyoxyalkylene polyamines, polyols and chain extenders. The products that may be made are well known in the art and include products ranging from flexible foams to cast and RIM elastomers or rigid foams, and other variations. These products and their manufacture are well known to those skilled in the art.

Additional ingredients which may be used if desired for specific applications include blowing agents, catalysts, fillers, coloring agents and surfactant materials. Those skilled in the art will recognize that some or all ingredients may not be necessary, especially in the case of catalysts. If the quasi-prepolymer of the invention is further reacted with a polyoxyalkylene polyamine, a catalyst may not be necessary. However, if the prepolymer is to be further reacted with a hydroxyl containing material such as a polyol, a catalyst may be desirable. The following description of optional materials is set out to instruct those attempting to use the quasi-prepolymers of this invention in the ingredients they may find useful as workers skilled in the art.

It may be desirable to incorporate chain extenders into the reaction between the quasi-prepolymer of this invention and either polyols or polyoxyalkylene polyamines of high molecular weight. Hydroxyl containing chain extenders such as ethylene glycol, 1,4-butane diol and the like may be used.

Also useful are aromatic diamine chain extenders including, for example, 1-methyl-3,5-diethyl-2,4-diaminobenzene, 1-methyl-3,5-diethyl-2,6-diaminobenzene (both of these materials are also called diethyltoluene diamine or DETDA), 1,3,5-triethyl-2,6-diaminobenzene, 3,5,3',5'-tetraethyl-4,4'-diaminodiphenylmethane, t-butyl toluene diamine and related isomers, and the like. Particularly preferred aromatic diamine chain extenders are 1-methyl-3,5-diethyl-2,4-diaminobenzence or a mixture of this compound with 1-methyl-3,5- diethyl-2,6-diaminobenzene. Other chain extenders include aliphatic materials, for example, as described in U.S. Pat. Nos. 4,246,363 and 4,269,945.

Other chain extenders which find use in the method of this invention are low molecular weight polyoxyalkylene polyamines which contain terminal amine groups and are represented by the formula

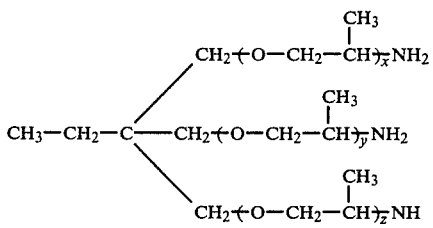

wherein $x+y+z$ has a value of about 5.3. The product is commercially available from Texaco Chemical Company as JEFFAMINE ® T-403. Another related polyoxypropylene polyamine is represented by the formula

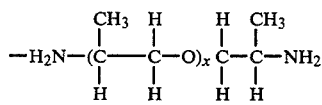

wherein x has a value of about 5.6. This product is commercially available from Texaco Chemical Company as JEFFAMINE ® D-400. The product having the same formula as above wherein x has an average value of about 2.6 is also useful. This product is commercially available from Texaco Chemical Company as JEFFAMINE ® D-230.

Other chain extenders will be apparent to those skilled in the art.

If needed, the following catalysts may be useful when reacting the composition of this invention with isocyanate. Catalysts such as tertiary amines, organic lead compounds, an organic tin compound or other polyurethane catalysts may optionally be used. The organic tin compound may suitably be a stannous or stannic compound such as a stannous salt of a carboxylic acid, a trialkyltin oxide, a dialkyltin dihalide, a dialkyltin oxide, etc., wherein the organic group of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine); heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc.; and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

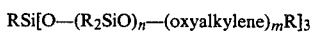

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Preparation of Quasi-Prepolymers of Polyoxyalkylene Polyamines and Aliphatic Isocyanates

EXAMPLE 1

Into a paper cup, isophorone diisocyanate (5.13 g, 43.5 meq of isocyanate) was added. JEFFAMINE ® T-5000 (25 g, 14.5 meq of amine) was slowly added to the isophorone diisocyanate, with stirring, over a 20 minute period. After all of the JEFFAMINE T-5000 was added, the product was somewhat fluid. It would flow at room temperature.

EXAMPLE 2

To a dry, 1 liter, three-neck flask equipped with a nitrogen inlet and a mechanical stirrer, isophorone diisocyanate (123.2 g, 1044 meq of isocyanate) was added. JEFFAMINE T-5000 (300 g, 174 meq of amine) was slowly added to the stirred solution over a 2.25 hour period at ambient temperature. The thick liquid product had an isocyanate content of 1.99 meq/g and a room temperature viscosity of 6425 cps.

EXAMPLE 3

To a dry, 1 liter, three-neck flask equipped with a nitrogen inlet and a mechanical stirrer, isophorone diisocyanate (164.0 g, 1398 meq of isocyanate) was added. JEFFAMINE T-5000 (300 g, 174 meq of amine) was slowly added to the stirred solution over a 4 hour period at ambient temperature. The liquid product had an isocyanate content of 2.66 meq/g and a room temperature viscosity of 2510 cps.

EXAMPLE 4

To a dry, 1 liter, three-neck flask equipped with a nitrogen inlet and a mechanical stirrer, isophorone diisocyanate (164.0 g, 1398 meq of isocyanate) was added. JEFFAMINE D-4005 (300 g, 150 meq of amine) was slowly added to the stirred solution over a 5 hour period at ambient temperature. The liquid product had an isocyanate content of 2.67 meq/g and a room temperature viscosity of 1375 cps.

EXAMPLE 5

To a dry, 1 liter, three-neck flask equipped with a nitrogen inlet and a mechanical stirrer, isophorone diisocyanate (164.0 g, 1398 meq of isocyanate) was added. JEFFAMINE D-2000 (300 g, 300 meq of amine) was slowly added to the stirred solution over a 6 hour period at ambient temperature. The liquid product, 462.0 g, had an isocyanate content of 2.39 meq/g and a room temperature viscosity of 4485 cps.

EXAMPLE 6

To a dry, 1 liter, three-neck flask equipped with a nitrogen inlet and a mechanical stirrer, isophorone diisocyanate (164.0 g, 1398 meq of isocyanate) and 200 g FREON ® 11 were added. JEFFAMINE T-5000 (300 g, 174 meq of amine), dissolved in 118 g of FREON 11, was slowly added to the stirred solution over a 5.5 hour period at ambient temperature. A vacuum was used to remove the solvent while the temperature of the product was raised to 60° C. Upon cooling, the liquid product, 464.4 g, had an isocyanate content of 2.69 meq/g and a room temperature viscosity of 1905 cps.

EXAMPLE 7

To a dry, 1 liter, three-neck flask equipped with a nitrogen inlet and a mechanical stirrer, dicyclohexane methane diisocyanale (164.0 g, 1252 meq of isocyanate) and 150 g of FREON 11 were added. JEFFAMINE T-5000 (300 g, 174 meq of amine), dissolved in 150 g of FREON 11, was slowly added to the stirred solution over a 6 hour period at ambient temperature. A vacuum was used to remove the solvent while the temperature of the product was raised to 100° C. Upon cooling, the liquid product, 469.6 g, had an isocyanate content of 2.06 meq/g.

EXAMPLE 8

To a dry, 1 liter, three-neck flask equipped with a nitrogen inlet and a mechanical stirrer, isophorone diisocyanate (53.0 g, 449 meq of isocyanate) 4 drops of T-12 and 125.0 g of p-dioxane were added. JEFFAMINE T-5000 (197 g, 114.0 meq of amine), dissolved in 125.0 g of p-dioxane, was slowly added to the stirred solution over a 4.5 hour period at ambient temperature. The liquid product, 498.1 g, had an isocyanate content of 0.64 meq/g.

Examples 9-12 describe the procedures for the synthesis of a quasi-prepolymer. A polyol was used in Examples 9 and 10, and a polyoxyalkylene amine in Examples 11 and 12. Examples 13-16 describe the casting of the elastomers made from the quasi-prepolymers in Examples 9-12.

Examples 13 and 14 illustrate the difference between a polyurethane system (Example 13) and a polyurea system (Example 14). Different reactivities are seen when the elastomer is made from the respective polyol or polyamine. In Example 13, the quasiprepolymer had to be heated with a catalyst so that it would react with the polyol. In Example 14, the quasi-prepolymer did not require heat or a catalyst to react with the polyamine.

Example 15 is an elastomer which, for the most part, is composed of urethane bonds formed from the reaction of the isocyanate and the polyol. The reaction of diethyltoluenediamine with the isocyanate does form some urea bonds. Example 16 is an elastomer which, for the most part, is composed of all urea bonds formed from the reaction of the polyoxyalkylene amine and diethyltoluenediamine with the isocyanate. Examples 15 and 16 were cast at the same time.

The improvement that this invention has is clearly shown when the process and properties of the two types of elastomers are compared to each other. In the processing of the cast elastomer, no heat or catalyst is required to carry out the reaction between the quasi-prepolymer and the polyoxyalkylene amine. The elastomers which have urea bonds at the interface are superior than elastomers which have urethane bonds at the interface.

Examples 13 and 14 should be compared to each other. In Example 13, the reaction between the polyol and the quasi-prepolymer had to be heated with a catalyst for the reaction to occur at a reasonable rate. In Example 14, the reaction between the polyoxyalkylene amine and the quasi-prepolymer did not have to be heated nor a catalyst added for the reaction to occur. Examples 15 and 16 should be compared to each other. These examples had all of the polyol or polyamine on the "A" side. No heating was required for the "B" side to react with the "A" side. The catalyst added in Examples 11 and 12 were added just to keep all of the examples the same. It was not needed for the reaction to take place. The only difference being the polyol or polyoxyalkylene amine.

On a commercial scale, it may not be possible for all of the polyoxyalkylene amine to be on the "A" side of the system because of mechanical limitations. In which case, a situation such as Example 14 will occur. The processing advantages can be easily seen for Example 14 over Example 13.

The physical properties of the elastomers prepared in Examples 13-16 are shown in Table 1.
Synthesis of Quasi-Prepolymers

EXAMPLE 9

Synthesis of the Quasi-prepolymer from Polyol G-5000

In the same manner as Example 10 (following), isophorone diisocyanate (164 g) and 3 drops of the catalyst, T-12, were added to a flask. The polyol, G-5000 (300 g), was slowly added to the stirred solution over a 3.5 hour period. No solvent was used in this reaction. Analysis of the product several days later showed it to have an isocyanate content of 2.69 meq/g.

EXAMPLE 10

Synthesis of the Quasi-prepolymer from Polyol G-5000

To a clean, dry, 2 liter three-neck flask which had been flushed with nitrogen, 53.9 g of isophorone diisocyanate, 125.0 g of tetrahydrofuran, and 4 drops of T-12 were added to the fask. A mechanical stirrer was connected to the flask along with a nitrogen inlet and a dropping funnel. With stirring, G-5000 (200.3 g), which was dissolved in 125 g of tetrahydrofuran, was added to the reaction flask over a 15 minute period after which the contents of the flask were heated to 60° C. for 20 hours. Upon cooling, 494.4 g of a clear liquid was recovered which had a free isocyanate content of 0.66 meq/g upon analysis.

EXAMPLE 11

Synthesis of the Quasi-prepolymer from JEFFAMINE T-5000

In the same manner as Example 10, isophorone diisocyanate (164 g) and JEFFAMINE ® T-5000 (300 g) were reacted together at 80° C. The JEFFAMINE T-5000 was slowly added to the heated isophorone diisocyanate over a 6.5 hour period. Upon cooling, the liquid product had an isocyanate content of 2.71 meq/g and a Brookfied viscosity of 2720 cps.

EXAMPLE 12

Synthesis of the Quasi-prepolymer from JEFFAMINE T-5000

To a clean, dry, 2 liter, three-neck flask which had been flushed with nitrogen, 53 g of isophorone diisocyanate, 125 g of tetrahydrofuran, and 4 drops of T-12 were added to the flask. A mechanical stirrer was connected to the flask along with a nitrogen inlet and a dropping funnel. With stirring, T-5000 (197 g), which was dissolved in 125 g of tetrahydrofuran, was added to the reaction flask over a 110 minute period after which the contents of the flask were heated to 60° C. for 20 hours. Upon cooling, 499.9 g of a clear liquid as recovered which had a free isocyanate content of 0.62 meq/g upon analysis.

Casting of the Elastomers Mold Preparations

To a clean mold, 15 cm×15 cm×2 mm deep, TRULEASE ® 125 was sprayed on the surface of the nickel plated mold. Any excess mold release agent was wiped off after 5 minutes of drying.

EXAMPLE 13

Polyurethane Cast Elastomer

To a clean and dry 500 ml single-neck round bottom flask were added 15 g of the quasi-prepolymer made in Example 9, 10 g of the Polyol G-5000, and 30 g of methyl ethyl ketone. This mixture was rolled around in the flask and heated to 80° C. for 5 minutes. The mixture was cooled to 50° C. at which time diethyltoluene diamine (3.1 g) was added to the reaction mixture. A vacuum was pulled on the flask to remove air bubbles for 3 minutes. Then, a nitrogen atmosphere replaced the vacuum. The contents of the flask were poured into the mold. The mold was left alone overnight while the elastomer set up and the solvent evaporated. The following morning the mold was placed in an oven at 80° C. for 6 hours. The mold was removed and cooled to room temperature. The cast elastomer was removed from the mold and sent off to be tested.

EXAMPLE 14

Polyurea Cast Elastomer

To a clean and dry 500 ml single-neck round bottom flask were added 15 g of the quasi-prepolymer made in Example 11, 10 g of the JEFFAMINE ® T-5000, and 30 g of methyl ethyl ketone. This mixture was rolled around in the flask at which time diethyltoluene diamine (3.1 g) was added to the reaction mixture. A vacuum was pulled on the flask to remove air bubbles for 3 minutes. Then, a nitrogen atmosphere replaced the vacuum. The contents of the flask were poured into the mold. The mold was left alone overnight while the elastomer set up and the solvent evaporated. The following morning the mold was placed in an oven at 80° C. for 6 hours. The mold was removed and cooled to room temperature. The cast elastomer was removed from the mold and sent off to be tested.

EXAMPLE 15

Polyurethane Cast Elastomer

From the quasi-prepolymer of Example 10, 46.7 g were added to a clean and dry 500 ml single-neck flask. Tetrahydrofuran, 3 g, was added to the flask. While swirling the flask, 2.76 g of diethyltoluene diamine was slowly added to the quasi-prepolymer over a 30 second period, after which the contents of the flask were placed under a vacuum for 2 minutes to minimize air bubbles forming in the cast elastomer. A nitrogen atmosphere replaced the vacuum and the contents of the flask were poured into the mold. The cast elastomer was allowed to dry at room temperature for 20 hours prior to drying in the oven at 80° C. for 7 hours. After drying the elastomer in the oven to remove the solvent, the hot mold was removed from the oven and allowed to cool to ambient temperature. No shrinking of the cast elastomer was noticed. The cast elastomer was removed from the mold and tested:

EXAMPLE 16

Polyurea Cast Elastomer

The quasi-prepolymer of Example 12, 50 g, was added to a clean and dry 500 ml single-neck flask. While swirling the flask, 2.76 g of diethyltoluene diamine was slowly added to the quasi-prepolymer over a 30 second period, after which the contents of the flask were placed under a vacuum for 2 minutes to minimize air bubbles forming in the cast elastomer. A nitrogen atmosphere replaced the vacuum and the contents of the flask were poured into the mold. The cast elastomer was allowed to dry at room temperature for 20 hours prior to drying in the oven at 80° C. for 7 hours. After drying the elastomer in the oven to remove the solvent, the hot mold was removed from the oven and allowed to cool to ambient temperature. No shrinking of the cast elastomer was noticed. The cast elastomer was removed from the mold and tested.

Testing of the elastomers

All of the elastomers where held in a room at a relative humidity of 50% for 5 days prior to testing.

TABLE 1

Properties of the Solvent Cast Elastomers

| | Example 13 | Example 14 | Example 15 | Example 16 |
|---|---|---|---|---|
| Tensile strength, psi | 1290 | 3630 | 3740 | 4850 |
| Elongation, % | 557 | 480 | 515 | 500 |
| Tear, pli | 223 | 307 | 350 | 430 |
| Shore D hardness, | | | | |
| 0 sec | 24 | 33 | 31 | 35 |
| 10 sec | 20 | 30 | 29 | 32 |
| Tensile modulus, psi | 519 | 906 | 740 | 890 |
| Soft block, % | 70.1 | 70.1 | 70.71 | 70.97 |

GLOSSARY OF TERMS AND MATERIALS

JEFFAMINE ® T-5000—Polypropylene oxide triamine of about 5,000 molecular weight; a product of Texaco Chemical Co., Inc.

JEFFAMINE T-403—Polypropylene oxide triamine of about 400 molecular weight; a product of Texaco Chemical Co., Inc.

JEFFAMINE D-2000—Polypropylene oxide diamine of about 2,000 molecular weight; a product of Texaco Chemical Co., Inc.

JEFFAMINE D-4005—Polyoxypropylene/alkylene oxide diamine of about 4,000 molecular weight; a product of Texaco Chemical Co., Inc.

Polyol G—5000—Polypropylene oxide triol of about 5,000 molecular weight.

TRUELEASE ® 125—External mold release agent; a product of Rimlease.

FREON ® 11—Low boiling fluorocarbon; a product made by E. I. duPont de Nemours & Co.

We claim:

1. A reaction product of a polyoxyalkylene polyamine and an aliphatic isocyanate wherein the polyoxyalkylene polyamine is present in less than the stoichiometric amount.

2. A reaction product of a polyoxyalkylene polyamine and an aliphatic isocyanate wherein the polyoxyalkylene polyamine is present in less than the stoichiometric amount wherein the poly oxyalkylene polyamine has a greater than 1500 average molecular weight and a functionality ranging from 2 to 6, and has greater than 50% of its active hydrogens in the form of amine hydrogens.

3. A method for preparing a reaction product of a polyoxyalkylene polyamine and an aliphatic isocyanate wherein polyoxyalkylene polyamine is present in less than the stoichiometric amount comprising mixing the two together under conditions such that the reaction between them takes place uniformly throughout the mixture.

4. A cast elastomer made by mixing together a reaction product of a polyoxyalkylene polyamine and an aliphatic isocyanate wherein the polyoxyalkylene polyamine is present in less than the stoichiometric amount with an additional amount of a polyoxyalkylene polyamine and a crosslinker, and allowing the mixture to cure.

5. A cast elastomer made by mixing together a reaction product of a polyoxyalkylene polyamine and an aliphatic isocyanate wherein the polyoxyalkylene polyamine is present in less than the stoichiometric amount and wherein the polyoxyalkylene polyamine has a greater than 1500 average molecular weight and a functionality ranging from 2 to 6, and has greater than 50% of its active hydrogens in the form of amine hydrogens with an additional amount of a polyoxyalkylene polyamine and a crosslinker and allowing the mixture to cure.

6. A cast elastomer made by mixing together a reaction product of a polyoxyalkylene polyamine and an aliphatic isocyanate wherein the polyoxyalkylene polyamine is present in less than the stoichiometric amount and is the entire amount of polyoxyalkylene polyamine in the elastomer with a crosslinker and allowing the mixture to cure.

7. A cast elastomer made by mixing together a reaction product of a polyoxyalkylene polyamine and an aliphatic isocyanate wherein the polyoxyalkylene polyamine is present in less tha the stoichiometric amount and is the entire amount of polyoxyalkylene polyamine in the elastomer and wherein the polyoxyalkylene polyamine has a greater than 1,500 average molecular weight and a functionality ranging from 2 to 6, and has greater than 50% of its active hydrogens in the form of amine hydrogens with a crosslinker and allowing the mixture to cure.

* * * * *